United States Patent [19]
Guerin

[11] 4,324,619
[45] Apr. 13, 1982

[54] APPARATUS FOR SUSPENDING THERMAL SHIELDING WITHIN A NUCLEAR REACTOR

[75] Inventor: William F. Guerin, Greensburg, Pa.

[73] Assignee: Electric Power Research Institute, Inc., Palo Alto, Calif.

[21] Appl. No.: 80,515

[22] Filed: Oct. 1, 1979

[51] Int. Cl.³ .............................................. G21C 13/04
[52] U.S. Cl. ...................................... 376/290; 52/224; 248/DIG. 1; 292/312; 292/318
[58] Field of Search .................... 176/87; 52/167, 224, 52/615, 618; 220/9 D, 10; 248/DIG. 1, 358 AD, 18; 292/312, 318

[56] References Cited
U.S. PATENT DOCUMENTS

| | | | |
|---|---|---|---|
| 3,881,288 | 5/1975 | Fay | 176/87 |
| 4,050,988 | 9/1977 | Lemercier | 176/87 |
| 4,216,059 | 8/1980 | Lemercier | 176/87 |

*Primary Examiner*—Donald P. Walsh
*Attorney, Agent, or Firm*—Flehr, Hohbach, Test

[57] ABSTRACT

Apparatus for suspending thermal shielding within a nuclear reactor. The apparatus includes a plurality of horizontally deformable, interconnected links which form a chain and suspend a series of horizontally disposed equally spaced thermally reflective plates from beneath the upper horizontal boundary of a nuclear reactor. The deformable links minimize heat transfer and accommodate both seismic and differential thermal expansion of the reflective plates.

3 Claims, 4 Drawing Figures

U.S. Patent  Apr. 13, 1982  4,324,619
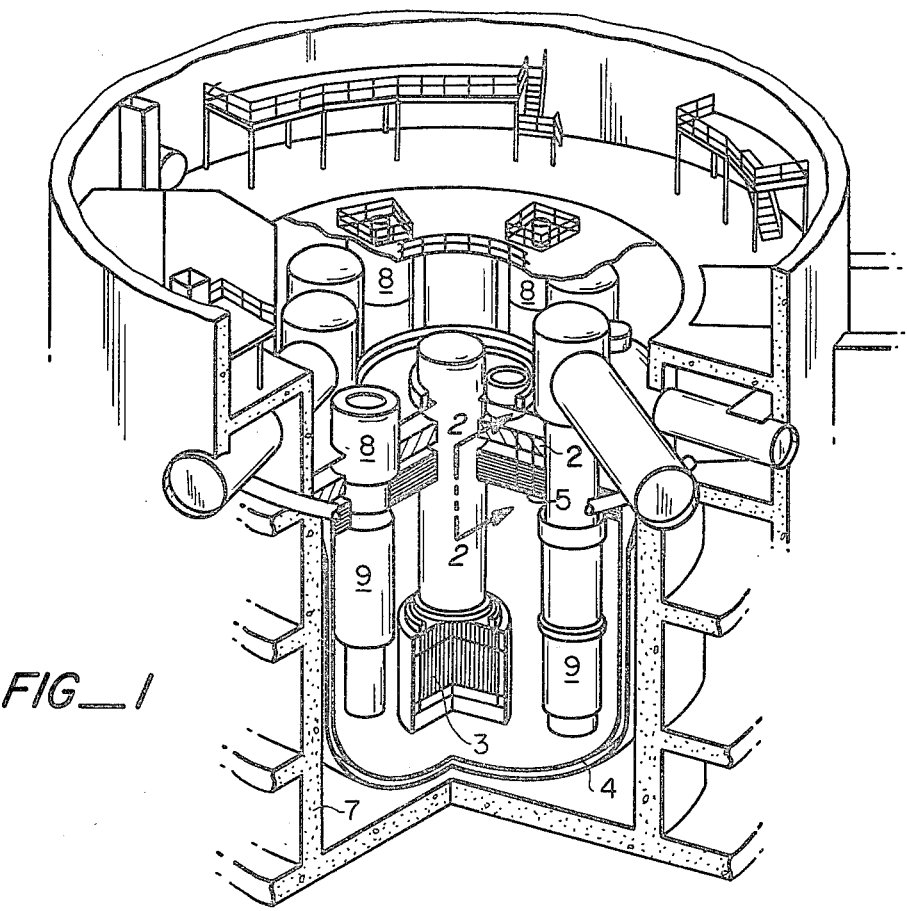
FIG__1
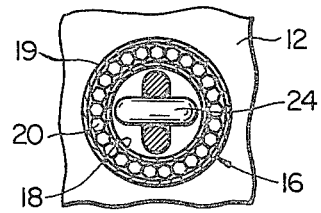
FIG__3
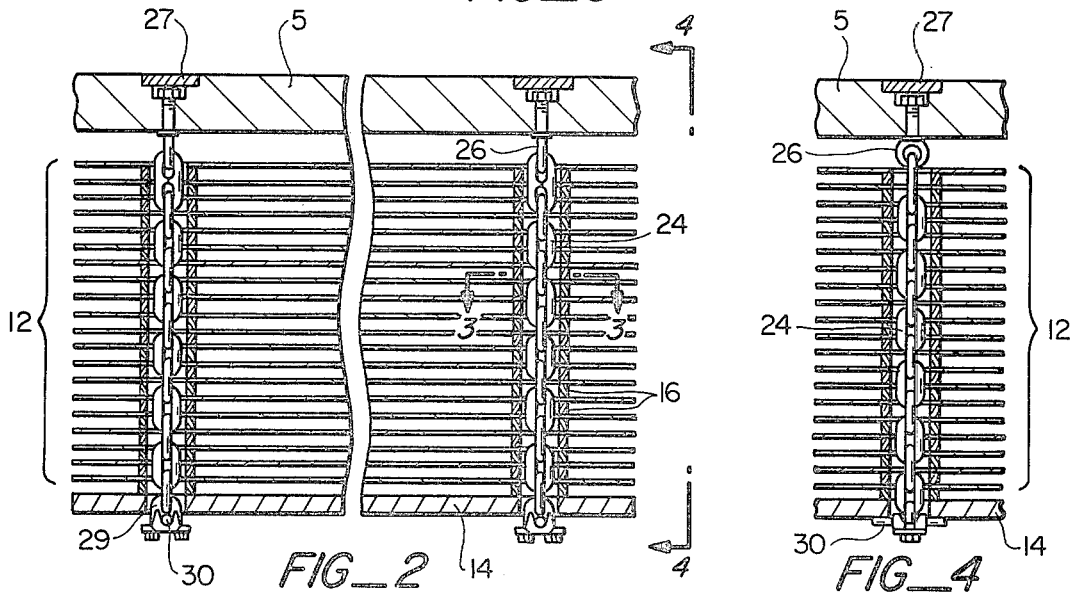
FIG__2   FIG__4

APPARATUS FOR SUSPENDING THERMAL SHIELDING WITHIN A NUCLEAR REACTOR

The present invention generally relates to nuclear reactor thermal shielding and, more particularly, to apparatus for suspending such shielding from the upper horizontal boundary of a nuclear reactor.

Nuclear reactors operate at high temperatures and liquid metal cooled nuclear reactors in particular operate with core outlet temperatures between 800° and 1000° F. These high coolant temperatures could cause temperature gradients and thermal stresses in the reactor deck structure if it were not insulated, since the upper part of the deck is at essentially ambient temperature in some designs. At the present time, reactor vessel decks are shielded from the high core outlet temperatures and temperature transient effects by either canned stainless steel foil insulation or thermally reflective shield plates.

The current systems for suspending either canned insulation or reflective plates from the horizontal boundaries in a nuclear reactor all face the problem of accomodating a temperature gradient of approximately 800° F. through the insulation during normal operation. The thermal shield support system must also be designed for seismic loading since the shielding is horizontal and is suspended from an upper horizontal reactor boundary. Another problem with suspending insulation is minimizing thermal shorts in the suspension system, which can reduce the overall efficiency of the insulation system.

One object of the present invention is to reduce the heat transfer between the hot liquid metal surface and the reactor deck as much as possible by minimizing thermal shorts in the support system. This object is achieved by using chains to support the thermal shielding. The heat conduction path through the interconnected links of a chain is very small because conduction is possible only at the points of contact between the links.

An additional object of the present invention is to accommodate the differential thermal expansion of the shielding without developing stresses. In a typical installation there are approximately 20 to 30 reflective shield plates that are exposed to a temperature gradient of approximately 800° F. The plates near the hot sodium surface above the reactor core are subject to a nominal operating temperature of about 950° F. and the plates near the deck to a temperature of approximately 150° F. The supporting system must accommodate for the differential thermal expansion that occurs between the top and the bottom plates. This object is achieved by suspending the thermal shield plates from chains. Suspension chains can accommodate this differential thermal expansion very readily because they are horizontally deformable. Unlike solid hanger supporting systems which must bend as the lower plates laterally expand more than the upper plates, suspension chains merely adapt to the heated configuration of reflective plates and offer only the friction resistance of the links moving with respect to each other.

A further object of the present invention is to support the thermal shielding within a nuclear reactor during an earthquake or seismic shock. This object is achieved by suspending the thermal shield plates from chains attached to the under side of the deck. Such supporting chains have an extremely low natural frequency and are virtually uneffected by seismic forces.

The above objects and features are achieved by an apparatus for suspending thermal shielding within a nuclear reactor. This apparatus operates in a nuclear reactor vessel having a core wherein heat is produced by nuclear fission and a deck which provides an upper horizontal boundary for the reactor. The apparatus includes a plurality of horizontally disposed, thermally reflective plates and horizontally deformable link means for suspending the reflective plates from the deck so that the transfer of heat from the hot sodium pool to the deck is substantially reduced.

Additional objects and features of the invention will appear from the following description in which the preferred embodiment has been set forth in detail in conjunction with the accompanying drawings.

FIG. 1 is a perspective view, in section and broken away, illustrating a typical liquid metal fast breeder reactor and a thermal shield support system according to the present invention.

FIG. 2 is a side elevational view, broken away and in section taken along line 2—2 of FIG. 1.

FIG. 3 is a top plan view, broken away and in section taken along line 3—3 of FIG. 2.

FIG. 4 is an end elevational view, broken away and in section taken along line 4—4 of FIG. 2.

FIG. 2 illustrates a liquid metal fast breeder reactor wherein horizontally disposed thermal shielding and its associated suspension apparatus are installed. The reactor of FIG. 1 includes a core 3 wherein heat is produced by nuclear fission. The core is housed in a reactor vessel 4 that also contains the primary coolant which transfers the heat from the core. The reactor vessel has a deck 2 which is an upper horizontal boundary of the reactor. The reactor is suspended in a concrete walled cavity 7. The primary coolant within the reactor is circulated by four primary pumps 8 which circulate the heated coolant between the core and six intermediate heat exchangers 9. The intermediate heat exchangers transfer the heat produced by the core to a secondary coolant system which flows between the heat exchangers and the steam generating system (not shown).

Referring to FIGS. 2-4, the thermal shielding for the reactor includes a lower deck plate 5 which isolates the deck 2 from the hot sodium pool located above the core 3, FIG. 1. The lower deck plate 5 is rigidly secured to the deck 2 by known means (not shown). The thermal shielding comprises a plurality of thin, thermally reflective shield plates 12. These plates are horizontally disposed, parallel, and spaced apart. The purpose of these plates is to minimize the transfer of heat from the hot sodium above the reactor core to the lower deck plate 5 and the deck 2. The shielding also includes a bottom plate 14 which braces and supports the reflective plates 12. The reflective plates are vertically spaced apart by a plurality of cylindrical spacers 16 that minimize convective heat transfer.

Referring to FIG. 3, each cylindrical spacer 16 includes an inner side wall 18 and an outer side wall 19 fabricated from thin stainless steel. The annular space between the two side walls is filled with a honeycomb shaped metal sheet member. In the preferred embodiment the metal sheet member is stainless steel foil having a honeycomb shape 20. The cylindrical spacers are designed to support the weight and the loading of the reflective plates 12 while minimizing the flow of heat between the reactor core and the deck 5.

Referring to FIGS. 2,4 the thermally reflective plates 12 and the bottom plate 14 are suspended from the lower deck plate 5 by a plurality of chains 24. Each chain is comprised of a plurality of horizontally deformable, interconnected links of conventional construction. The chain is suspended from the bottom of the deck plate by the eye bolts 26. Each eye bolt is sealed with a cover plate 27. The chains hang vertically downward and are connected to the bottom plate 14 by a U-bolt or shackel 29 and a horizontally disposed, elongate rod 30. The U-bolt joins both the chain and the rod together so that the bottom plate rests on the rod. The thermally reflective plates 12 have holes through which the chains pass so that the plates do not contact the chains. The only physicial contact between the chains and the thermal shielding is through the elongate rods 30 which bear the weight of the entire assembly.

Referring to FIGS. 2 and 4, the thermally reflective plates 12, the cylindrical spacers 16 and the bottom plate 14 are assembled about the chains 24 during the initial construction of the reactor. The chains are thereafter suspended from the lower deck plate 5 by the eye bolts 26. The thermally reflective plates and the chains remain in service during the entire life of the reactor and it is contemplated that neither the thermal shielding nor its supporting apparatus will require maintenance or repair during the forty year design life of the reactor.

It should be understood from FIGS. 2 and 4 that the heat conduction path through the chains 24 is very small. Conduction occurs only at the points of contact between the links and between the bottom plate 14 and the rod 30. In addition, the system of supporting chains has an extremely low natural frequency and thus the apparatus is virtually insensitive to seismic loading.

It should further be noted in FIG. 2 that the lowermost plates 12 and the bottom plate 14 are subject to more thermal expansion than the upper plates because the lower plates are closer to the hot sodium surface and are exposed to higher temperatures. The chains are able to adapt to the differences in thermal expansion by having the links move relative to each other. In other words, the chains are horizontally deformable.

It should be understood that although this apparatus for suspending thermal shielding in a nuclear reactor has been disclosed in connection with a liquid metal cooled gas breeder reactor, the apparatus can be used in any reactor vessel.

In one embodiment of the present invention twenty (20) thermally reflective shield plates were used, each plate having a thickness of 0.15 inches and having a center to center spacing of 0.90 inches. The gap between plates is 0.75 inches. Each plate has a dimension of approximately 5' by 5'. All of the components are fabricated from stainless steel in order to withstand the sodium environment within the reactor. The apparatus has a thermal short value of less than 0.1% of the maximum heat flux of 300 BTU/sq.ft. hour through the bottom plate.

Thus, although the best mode contemplated for carrying out the present invention has been herein shown and described, it will be apparent that modification and variation may be made without departing from what is regarded to be the subject matter of the invention.

What is claimed is:

1. Apparatus for suspending thermal shielding within a nuclear reactor, comprising: (a) a nuclear reactor having a core wherein heat is produced by nuclear fission and a reactor vessel housing the core and liquid metal coolant and having a deck means which provides an upper horizontal boundary for the reactor; (b) a plurality of horizontally disposed thermally reflective plates; and (c) a plurality of horizontally deformable chains having interconnected links, said chains being connected to the deck and the reflective plates so that the transfer of heat from the liquid coolant above the reactor core to the deck is substantially reduced and said chains being connected to the lower surface of the deck so that the reflective plates are suspended therefrom.

2. Apparatus as in claim 1 wherein the reflective plates are vertically spaced apart and supported by a plurality of cylindrical spacers which minimize the transfer of heat between the reflective plates.

3. Apparatus as in claim 2 wherein the cylindrical spacers have an inner and outer cylindrical sidewall and an annulus containing a honeycomb-shaped, metal sheet member.

* * * * *